(12) United States Patent
Kim et al.

(10) Patent No.: US 8,060,664 B2
(45) Date of Patent: Nov. 15, 2011

(54) INTEGRATED CIRCUIT HAVING A PLURALITY OF INTERFACES AND INTEGRATED CIRCUIT CARD HAVING THE SAME

(75) Inventors: Ki-Hong Kim, Suwon-si (KR); Hwi-Taek Chung, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 1336 days.

(21) Appl. No.: 11/655,328

(22) Filed: Jan. 19, 2007

(65) Prior Publication Data

US 2008/0010562 A1     Jan. 10, 2008

(30) Foreign Application Priority Data

May 18, 2006   (KR) ..................... 10-2006-0044496

(51) Int. Cl.
   *G06F 3/00*   (2006.01)
(52) U.S. Cl. .............. 710/11; 710/16; 710/301
(58) Field of Classification Search .......... 710/10, 710/11, 14–19, 300, 301, 305, 306, 313
   See application file for complete search history.

(56) References Cited

U.S. PATENT DOCUMENTS

| | | | | |
|---|---|---|---|---|
| 6,138,918 A * | 10/2000 | Tarbouriech | ................ | 235/492 |
| 6,772,956 B1 * | 8/2004 | Leaming | ................ | 235/492 |
| 6,801,956 B2 * | 10/2004 | Feuser et al. | ................ | 710/14 |
| 6,883,715 B1 * | 4/2005 | Fruhauf et al. | ................ | 235/492 |
| 7,150,397 B2 * | 12/2006 | Morrow et al. | ................ | 235/451 |
| 2004/0093436 A1 * | 5/2004 | Colnot | ................ | 710/1 |
| 2004/0204898 A1 * | 10/2004 | Huang et al. | ................ | 702/127 |
| 2005/0045720 A1 * | 3/2005 | Fruhauf | ................ | 235/440 |
| 2006/0000917 A1 * | 1/2006 | Kim et al. | ................ | 235/492 |
| 2007/0158440 A1 * | 7/2007 | Nishizawa et al. | ................ | 235/492 |
| 2007/0175994 A1 * | 8/2007 | Fruhauf | ................ | 235/440 |
| 2007/0210174 A1 * | 9/2007 | Deprun et al. | ................ | 235/492 |
| 2007/0228154 A1 * | 10/2007 | Tran | ................ | 235/380 |
| 2009/0150704 A1 * | 6/2009 | Van Bosch | ................ | 713/340 |
| 2009/0177819 A1 * | 7/2009 | Kang | ................ | 710/105 |

FOREIGN PATENT DOCUMENTS

| | | |
|---|---|---|
| JP | 2004 151864 | 5/2004 |
| JP | 2004 280817 | 10/2004 |
| JP | 2004 362588 | 12/2004 |
| KR | 2006 0003260 | 1/2006 |

OTHER PUBLICATIONS

English Abstract for Publication No. 2004-151864.
English Abstract for Publication No. 2004-280817.
English Abstract for Publication No. 2004-362588.
English Abstract for Publication No. 1020060003260.

* cited by examiner

*Primary Examiner* — Khanh Dang
(74) *Attorney, Agent, or Firm* — F. Chau & Associates, LLC

(57) ABSTRACT

An integrated circuit supporting a first interface and a second interface and an integrated circuit card having the same includes the first interface capable of communicating with a first host, the second interface communicating with a second host, and a control block. The control block activates the second interface when a voltage level of a contact that the second host can be connected is in a first state at a first-occurring timepoint between a reference timepoint and a state transition timepoint of an external reset signal output from the first host, and deactivates the second interface when the voltage level of the contact is in a second state. The integrated circuit card has the integrated circuit built in.

15 Claims, 11 Drawing Sheets

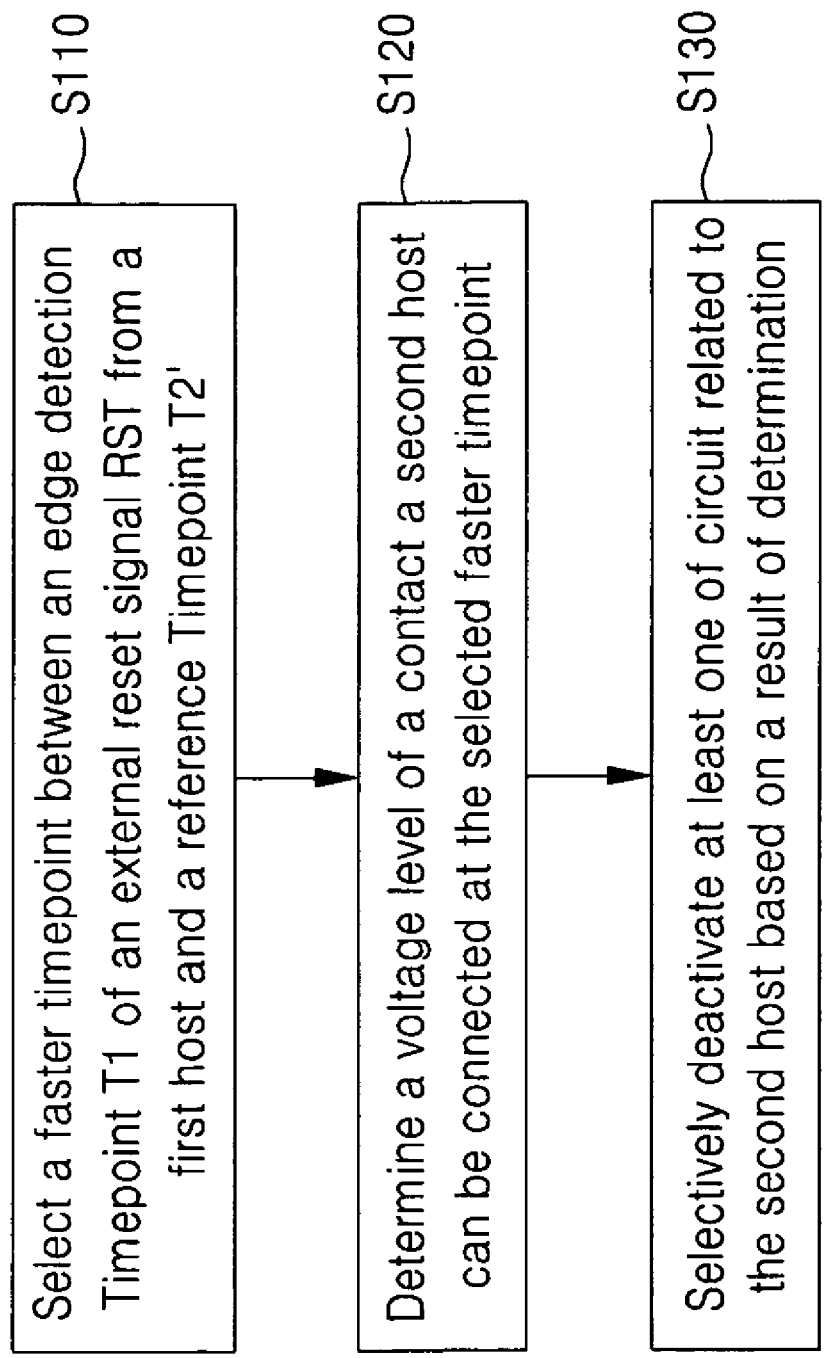

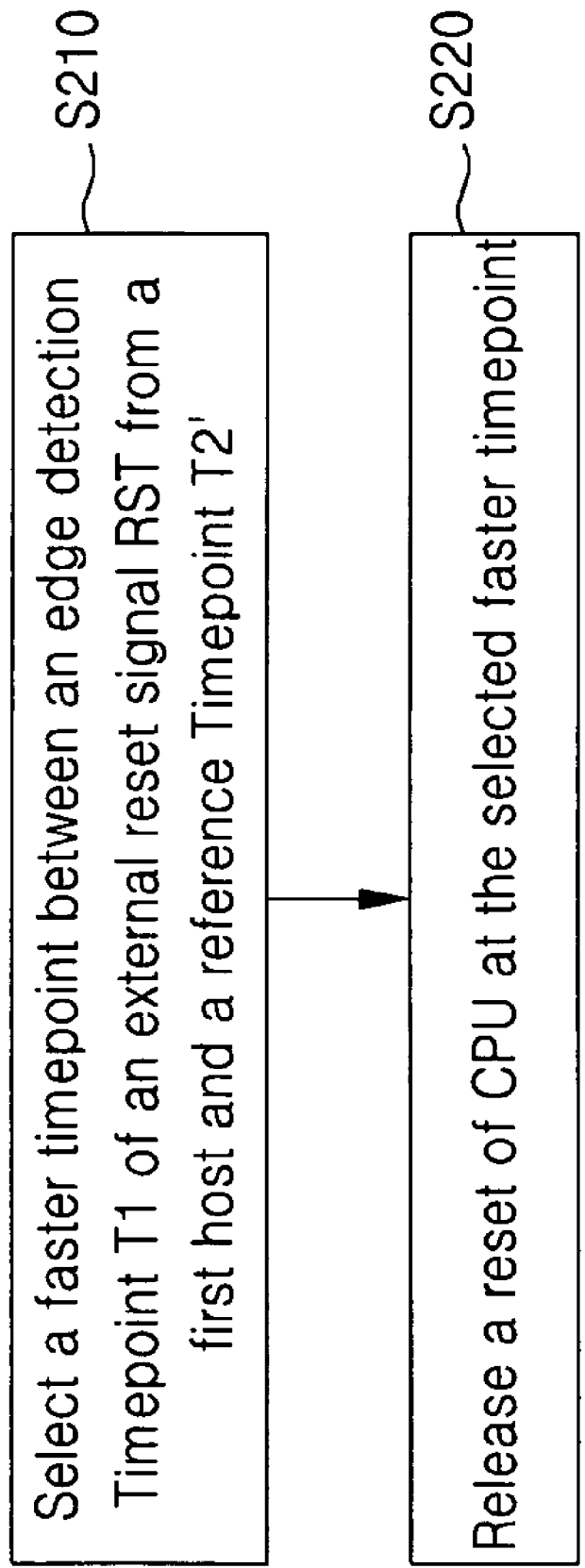

INTEGRATED CIRCUIT HAVING A PLURALITY OF INTERFACES AND INTEGRATED CIRCUIT CARD HAVING THE SAME

CROSS-REFERENCE TO RELATED APPLICATION

This application claims priority under 35 U.S.C. §119 from Korean Patent Application No. 10-2006-0044496, filed on May 18, 2006, the disclosure of which is hereby incorporated by reference herein as if set forth in its entirety.

BACKGROUND OF THE INVENTION

1. Technical Field

The present disclosure relates to an integrated circuit, and more particularly, to an integrated circuit having a plurality of interfaces and an integrated circuit card having the same.

2. Discussion of the Related Art

Integrated circuit (IC) cards are plastic cards in the size of credit cards having an IC chip (or IC) capable of handling specific transactions. The IC chip comprises a microprocessor, card operating system, security module, memory, etc. IC cards are also called smart cards. Contact-type smart cards are IC cards that interface with a card reader via physical contacts.

International Standards Organization (ISO) 7816 has defined a number of specifications for contact-type smart cards relating to physical properties, dimensions and location of contacts, electronic signals and transmission protocols, security, etc. IC cards capable of supporting a plurality of interfaces simultaneously or independently are now desired. IC cards that are capable of deactivating one or more unused interfaces are also desired.

SUMMARY OF THE INVENTION

Exemplary embodiments of the present invention provide an integrated circuit that can guarantee smooth operations of an integrated circuit card by determining whether or not a host capable of communicating though a corresponding interface is connected thereto. The integrated circuit can be provided within the integrated circuit card.

An integrated circuit according to an exemplary embodiment of the present invention includes a first interface capable of communicating with a first host, a second interface capable of communicating with a second host, and a control block.

The control block determines a voltage level of a contact where the second host can be connected. The second interface is deactivated selectively based on a result of the determination at the first-occurring timepoint of a reference timepoint and a state transition timepoint of an external reset signal output from the first host. The control block includes a CPU, an internal clock signal generator, a detection circuit, a first selection circuit, a second selection circuit, and a switch.

The internal clock signal generator generates an internal clock signal in response to a start signal. The detection circuit generates a first reset signal and a mode signal based on the start signal, the internal clock signal, the external reset signal, and the voltage level of the contact. The first selection circuit outputs one of an external clock signal output from the first host and the internal clock signal to the CPU based on the mode signal. The second selection circuit outputs, one of the external reset signal output from the first host and the first reset signal, to the CPU based on the mode signal. The switch outputs the internal clock signals to the second interface selectively based on the mode signal. The CPU preferably releases a reset in response to a second reset signal output from the second selection circuit.

The detection circuit includes a reset signal edge detector, a timer, an edge detection timepoint determination circuit, and a state detection circuit. The reset signal edge detector detects a state transition edge of the external reset signal output from the first host, and generates a detection signal. The timer generates a first indication signal indicating the reference timepoint in response to the start signal and the internal clock signal. The edge detection timepoint determination circuit outputs a second indication signal indicating the faster timepoint in response to the detection signal and the first indication signal. The state detection circuit determinates the voltage level of the contact based on the second indication signal, and generates the first reset signal and the mode signal based on a result of determination.

When the mode signal is activated based on the voltage level of the contact in a first state, the first selection circuit outputs the internal clock signal to the CPU, the second selection circuit outputs the first reset signal to the CPU, and the switch outputs the internal clock signal to the second interface, respectively, in response to the activated mode signal. When the mode signal is deactivated based on the voltage level of the contact in a second state, the first selection circuit outputs the external clock signal to the CPU, the second selection circuit outputs the external reset signal to the CPU, and the switch shuts off, respectively, in response to the deactivated mode signal.

An integrated circuit card according to the present invention includes a plurality of contacts and an integrated circuit connected to a plurality of corresponding contacts among the plurality of contacts. The integrated circuit includes a first interface capable of communicating with a first host through a first contact among the plurality of contacts; a second interface capable of communicating with a second host through a second contact among the plurality of contacts; and a control block determining a voltage level of the second contact at a first-occurring timepoint between a reference time point and a state transition timepoint of an external reset signal output from the first host, and deactivating the second interface selectively based on a result of the determination.

The control block includes a CPU; an internal clock signal generator generating an internal clock signal in response to a start signal; a detection circuit generating a first reset signal and a mode signal based on the start signal, the internal clock signal, the external reset signal, and the voltage level of the second contact; a first selection circuit for outputting one of an external clock signal output from the first host and the internal clock signal to the CPU; a second selection circuit for outputting one of the external reset signal output from the first host and the first reset signal to the CPU based on the mode signal; and a switch for outputting the internal clock signal to the second interface selectively based on the mode signal. The CPU preferably releases a reset in response to a second reset signal output from the second selection circuit.

The detection circuit includes a reset signal edge detector detecting a state transition edge of the external reset signal output from the first host and generates a detection signal; a timer outputs a first indication signal indicating the reference timepoint in response to the start signal and the internal clock signal; an edge detection timepoint determination circuit outputs a second indication signal indicating the first-occurring timepoint in response to the detection signal and the first indication signal; and a state detection circuit determining the voltage level of the second contact based on the second indication signal and generating the first reset signal and the mode signal based on a result of the determination.

A method of deactivating a predetermined interface of an integrated circuit card according to an exemplary embodiment of the present invention includes receiving an external reset signal output from a first host and detecting a state transition timepoint of the received external reset signal; choosing a first-occurring timepoint between a reference timepoint and the detected state transition timepoint; determining a voltage level of a contact capable of determining whether a second host is connected in the chosen first-occurring timepoint, and deactivating a second host interface selectively, which is capable of communicating with the second host through the contact based on a result of the determination.

The second host interface is activated when the voltage level of the contact is in a first state, and the second host interface is deactivated when the voltage level of the contact is in a second state.

BRIEF DESCRIPTION OF THE DRAWINGS

These and/or other aspects and features of exemplary embodiments of the present general inventive concept will become apparent and more readily appreciated from the following description of the exemplary embodiments, taken in conjunction with the accompanying drawings of which:

FIG. 10 is a flowchart illustrating an operating method of system according to an exemplary embodiment of the present invention; and FIG. 11 is a flowchart illustrating an operating method of system according to an exemplary embodiment of the present invention.

DETAILED DESCRIPTION OF THE EXEMPLARY EMBODIMENTS

Figure 1:
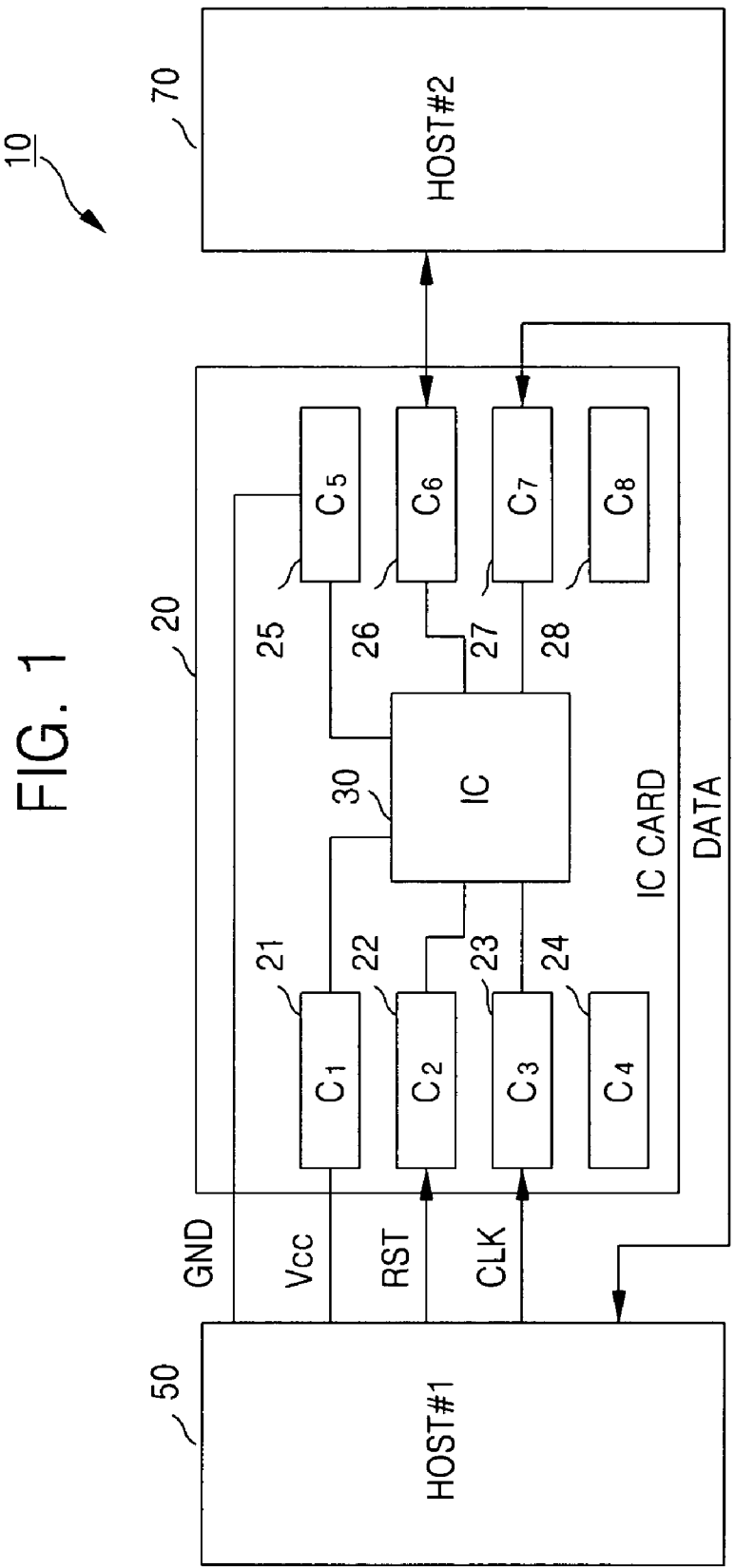
FIG. 1 illustrates a block diagram of a system including integrated circuit (IC) card according to an exemplary embodiment of the present invention and a plurality of hosts.

Reference will now be made in detail to exemplary embodiments of the present inventive concept, examples of which are illustrated in the accompanying drawings, wherein like reference numerals refer to the like elements throughout. The exemplary embodiments are described below in order to explain the present general inventive concept by referring to the figures.

FIG. 1 illustrates a block diagram of system including integrated circuit (IC) card 20 according to an exemplary embodiment of the present invention and a plurality of hosts 50 and 70. Referring to FIG. 1, the system 10 includes an integrated circuit (IC) card 20, a first host 50, and a second host 70.

The IC card 20, also called as a smart card, includes a plurality of electrical contacts 21 to 28 and an IC 30.

FIG. 1 shows electrical contacts 21 to 28 based on each pin's position and each pin's assignment according to the ISO 7816 standard. Contact C1 21 is for receiving operation power (or voltage) supplied to an IC 30 installed in the IC card 20, contact C2 22 is for receiving an external reset signal RST, contact C3 23 is for receiving an external clock signal CLK, contact C5 25 is for receiving a ground voltage GND, contact C6 26 is for receiving a program voltage, contact C7 27 is for inputting or outputting data, and contacts C4 24 and C8 28 are reserved contacts for future uses.

When the IC card 20 and the first host 50 are connected to each other, the operation power Vcc, the external reset signal RST, the external clock signal CLK, and the ground voltage GND are supplied from the first host 50 to the IC card 20.

After a reset of the IC card 20, for example, a CPU reset of an IC 30 installed in the IC card 20 is released, the IC card 20 and the first host 50 receive and transmit data to each other through the contact C7 27.

The first host 50 may be a host (hereinafter called "ISO host") capable of receiving and transmitting data with the IC card 20 by using a protocol according to the ISO 7816 standard. For example, the ISO host 50 may be a card reader. When the IC card 20 and the second host 70 are connected to each other through the contact C6 26, the IC card 20 according to an embodiment of the present invention may receive and transmit predetermined data with the second host 70 through the contact C6 26.

Also, the IC card 20 may receive and transmit data with the second host 70 through at least one of the reserved contacts C4 24 and C8 28. When the IC card 20 is only connected to the second host 70, the second host 70 may supply an operation power and a ground voltage to the IC card 20. The IC card 20 may receive and transmit predetermined data with the second host 70 through radio frequency (RF) communication. In this case, the IC card 20 may be supplied energy by using the RF communication from the second host 70 or other devices (not shown).

The second host 70 is a host capable of receiving and transmitting data through a contact (for example, C6 26) not used by the first host 50. The second host 70 may be called a single wire protocol (SWP) host ("SWP host"). For example, a SWP host 70 may be a host capable of RF communication. Also, the second host 70 may be a host capable of receiving and transmitting data through a contact (for example, C7 27 or C8 28).

The IC 30 of the present invention includes a first interface ("ISO interface") receiving and transmitting a predetermined data with the ISO host 50, and a second interface ("SWP interface") receiving and transmitting a predetermined data with the SWP host 70 through a signal line such as a signal line connected to C6 26.

Therefore, the IC 30 of the exemplary embodiments of the present invention may communicate with the ISO host 50 according to an ISO 7816 standard protocol, may communicate with the SWP host 70 according to a SWP protocol using the SWP host 70, or may also communicate with the ISO host 50 and the SWP host 70 simultaneously according to a corresponding protocol.

That is, the integrated circuit 30 according to the exemplary embodiments of the present invention determines a voltage level (for example, high level or low level) of the contact C6

26 where the second host 70 capable of communicating with the CPU through the second interface can be connected at a first-occurring timepoint (or time) between a state transition timepoint (or time) of an external reset signal output from the first host 50 capable of communicating with the CPU through the first interface and a reference timepoint (or reference time). The IC 30 may deactivate the second interface selectively based on a result of the determination.

For example, when the voltage level of the contact C6 26 is high level, the IC 30 of the present embodiment may deactivate the second interface or circuits (not shown) connected to be the second host 70.

Figure 2:
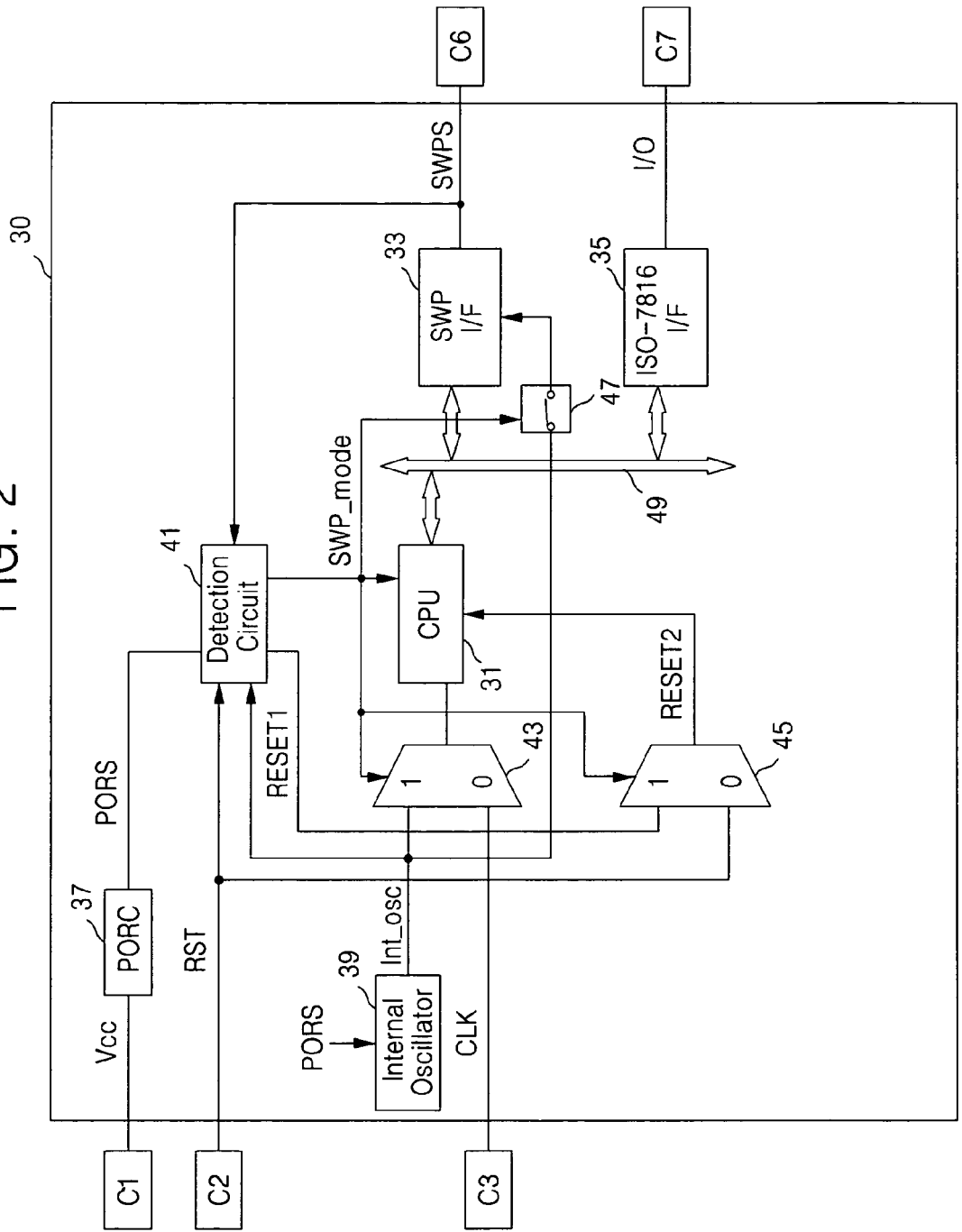
FIG. 2 illustrates a block diagram of an IC installed in the IC card illustrated in FIG. 1.

FIG. 2 illustrates a block diagram of an IC installed in the IC card illustrated in FIG. 1. Referring to FIGS. 1 and 2, the IC 30 includes a CPU 31, an SWP interface 33, an ISO interface 35, a POR circuit (PORC) 37, an internal oscillator 39, a detection circuit 41, a first selection circuit 43, a second selection circuit 45, a switch 47, and a bus 49. The first selection circuit 43 and the second selection circuit 45 may each be implemented as a MUX.

The CPU 31 generally controls operations of the IC card 20 or an IC 30. When the IC card 20 and the first host 50 are connected to each other, the CPU 31 may receive and/or transmit data with the first host 50 through the ISO interface 35 and the contact C7 27. Also, when the IC card 20 and the second host 70 are connected to each other, the CPU 31 may receive and/or transmit data with the second host 70 through the SWP interface 33 and the contact C6 26.

For example, when a reset of the CPU 31 is released in response to an activated second reset signal RESET2 the CPU 31 may exchange predetermined data with a corresponding host 50 or 70 through a corresponding interface 33 or 35 and the bus 49.

The power on reset (POR) circuit 37 generates a start signal PORS in response to an operation power Vcc supplied from the first host 50 or the second host 70 through the contact C1 21. The start signal PORS, as a power on reset signal, may reset the internal oscillator 39 and/or timer 303 illustrated in FIG. 3, or may release a reset of the internal oscillator 39 and/or the timer 303.

The internal oscillator 39 generates an internal oscillation signal Int_osc in response to the start signal PORS. When the IC card 20 and the second host 70 are connected to each other, the internal oscillation signal Int_osc is used as an operation clock of the CPU 31, therefore the internal oscillation signal Int_osc can be called an internal clock signal.

The detection circuit 41 determinates whether or not the SWP host 70 is connected based on the start signal PORS, the internal oscillation signal Int_osc, the external reset signal RST output from the first host 50, or a voltage level of the contact C6 26, and outputs a first reset signal RESET1 and a mode signal SWP_mode based on a result of the determination.

For example, when the SWP host 70 is connected to the contact C6 26, the voltage level of the contact C6 26 may be in a first state (for example, low level). When the SWP host 70 is not connected to the contact C6 26, the voltage level of the contact C6 26 may be in a second state (for example, high level).

When the voltage level of the contact C6 26 is in the first state (for example, low level), the detection circuit 41 outputs an activated first reset signal RESET1 and an activated mode signal SWP_mode. Therefore, the first selection circuit 43 supplies the internal oscillation signal Int_osc to the CPU 31 in response to the activated mode signal SWP_mode. The second selection circuit 45 supplies the first reset signal RESET1 as a second reset signal RESET2 to the CPU 31 in response to the activated mode signals SWP_mode. The reset of CPU 31 is released in response to the second reset signal RESET2 and operates in response to the internal oscillation signal Int_osc.

Also, since the switch 47 supplies the internal oscillation signal Int_osc to the SWP interface 33 in response to the activated mode signal SWP_mode, the SWP interface 33 is activated in response to the internal oscillation signal Int_osc. Therefore, the CPU 31, having a reset released in response to the activated second reset signal RESET2, receives and transmits data with the SWP host 70 through the activated SWP interface 33 and the contact C6 26.

However, when the voltage level of the contact C6 26 is in a second state (for example, high level), the detection circuit 41 outputs a deactivated mode signal SWP_mode. Therefore, the first selection circuit 43 supplies an external clock signal CLK output from an ISO host 50 in response to the deactivated mode signal SWP_mode to the CPU 31. The second selection circuit 45 supplies the external reset signal RST as the second reset signal RESET2 to the CPU 31 in response to the deactivated mode signal SWP_mode.

Also, since the switch 47 shuts off in response to the deactivated mode signal SWP_mode, the SWP interface 33 becomes deactivated. And the CPU 31 having a reset released in response to the deactivated external reset signal RST receives and transmits data with the ISO host 70 through the ISO interface 35 and the contact C7 in response to the external clock signal CLK.

Figure 3:
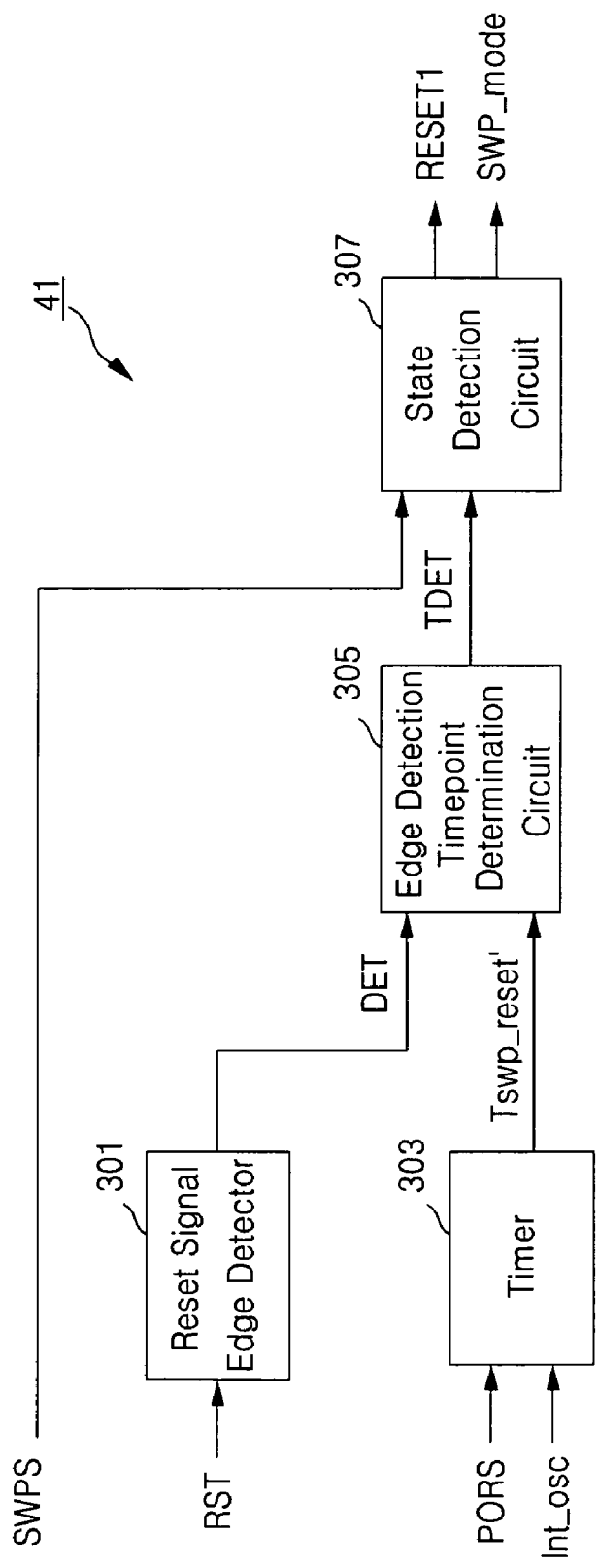
FIG. 3 illustrates a block diagram of a detection circuit illustrated in FIG. 2.

FIG. 3 illustrates a block diagram of a detection circuit illustrated in FIG. 2. Referring to FIGS. 1 through 3, the detection circuit 41 includes a reset signal edge detector 301, a timer 303, an edge detection timepoint determination circuit 305, and a state detection circuit 307.

The reset signal edge detector 301 detects a state transition edge of an external reset signal RST output from a first host 50, and outputs a detection signal DET. For example, when the external reset signal RST transits from low level (e.g. "0") to high level (e.g. "1"), the detection signal DET maintains the high level after a transition from the low level to the high level, or the detection signal DET may be a pulse (Refer to FIGS. 8 and 9).

The timer 303 outputs a first indication signal Tswp_reset' indicating a reference timepoint in response to a start signal PORS and an internal oscillation signal (or an internal clock signal) Int_osc. The edge detection timepoint determination circuit 305 outputs a second indication signal TDET indicating the first-occurring timepoint between the detection signal DET and the first indication signal Tswp_reset'. The state detection circuit 307 determinates a voltage level of the contact C6 26 based on the second indication signal TDET, generates a first reset signal RESET1 and a mode signal SWP_mode based on a result of the determination.

Figure 4:
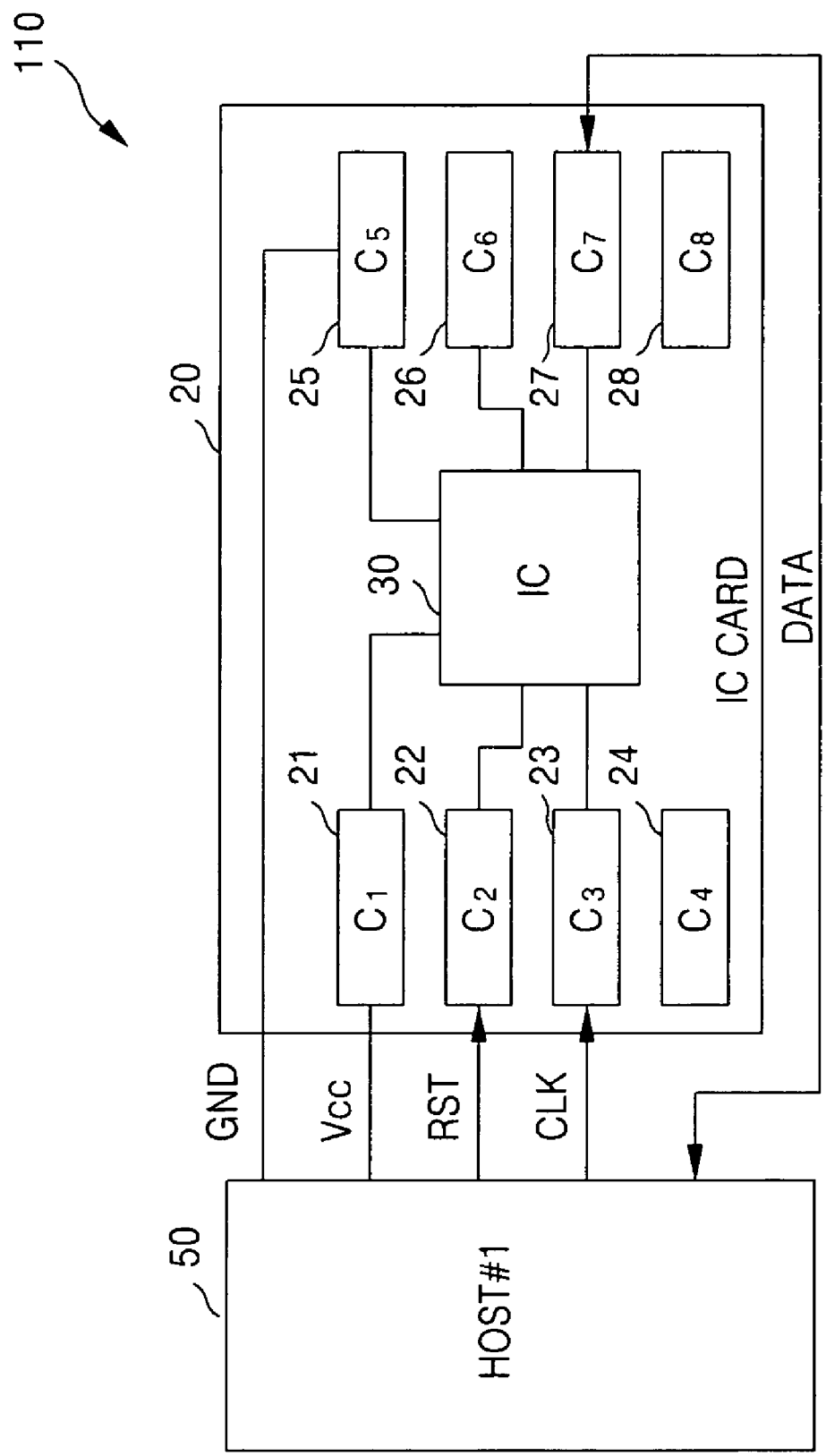
FIG. 4 illustrates a block diagram of a system including a host using an ISO-7816 protocol and the IC card according to an exemplary embodiment of the present invention.
Figure 5:
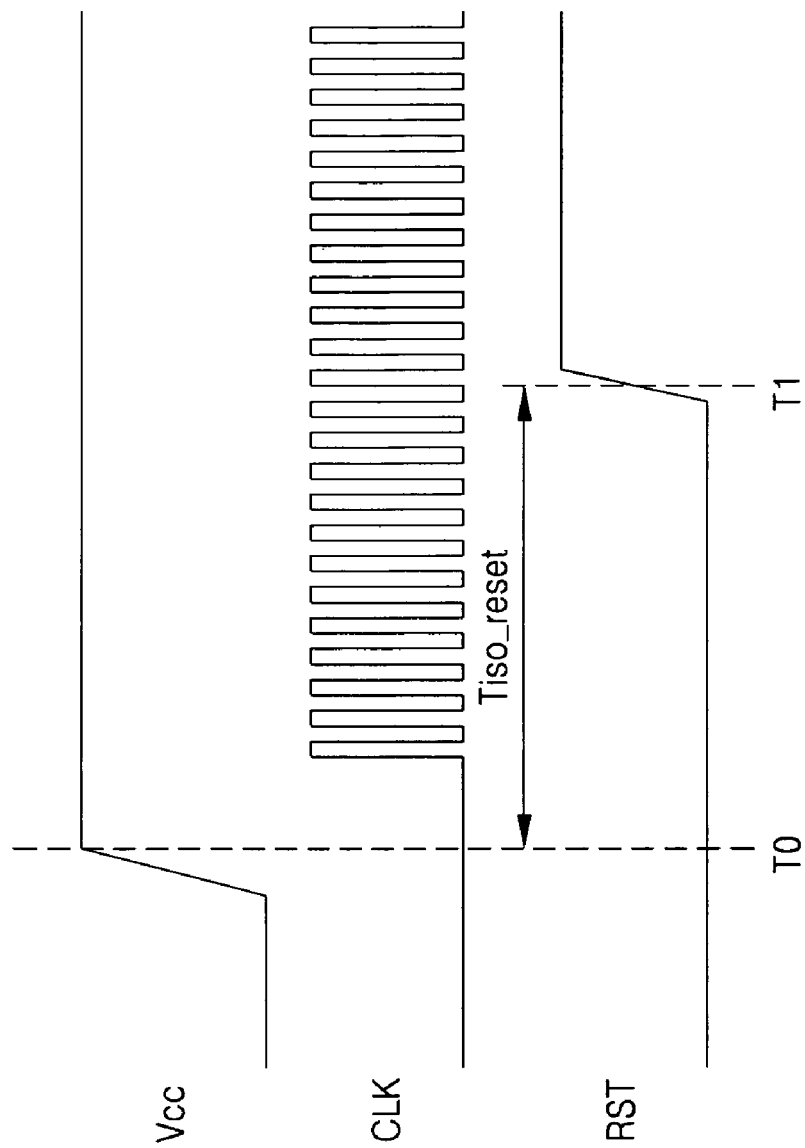
FIG. 5 is a timing diagram illustrating a power-up sequence according to the ISO-7816 protocol.

FIG. 4 illustrates a block diagram of the system including a host using an ISO-7816 protocol and an IC card according to an exemplary embodiment of the present invention, and FIG. 5 is a timing diagram illustrating a power-up sequence according to the ISO-7816 protocol.

Referring to FIGS. 1 through 5, an operation power (or voltage) Vcc, a ground voltage GND, an external reset signal RST, and an external clock signal CLK are supplied from the first host 50 to the IC card 20. For example, the first host 50 supplies the external reset signal RST and the external clock signal CLK to the CPU 31 (FIG. 2).

After power-up, since the first host 50 supplies the external reset signal RST in a first state to the CPU 31 of the IC card 20 for a first time period T1=Tiso_reset measured from a predetermined timepoint T0, the CPU 31 maintains a reset state.

However, the first host 50 supplies the external reset signal RST in a second state immediately after the timepoint T1=Tiso_reset has passed. The external clock signal CLK is supplied from before the reset signal RST transits its state.

Therefore, the CPU 31 of the IC card 20 releases a reset in response to the external reset signal RST in the second state, and outputs an answer to reset (ATR) to the first host 50 through the contact C7 27. The IC card 20 and the first host 50 exchange data through the contact C7 27.

Figure 6:
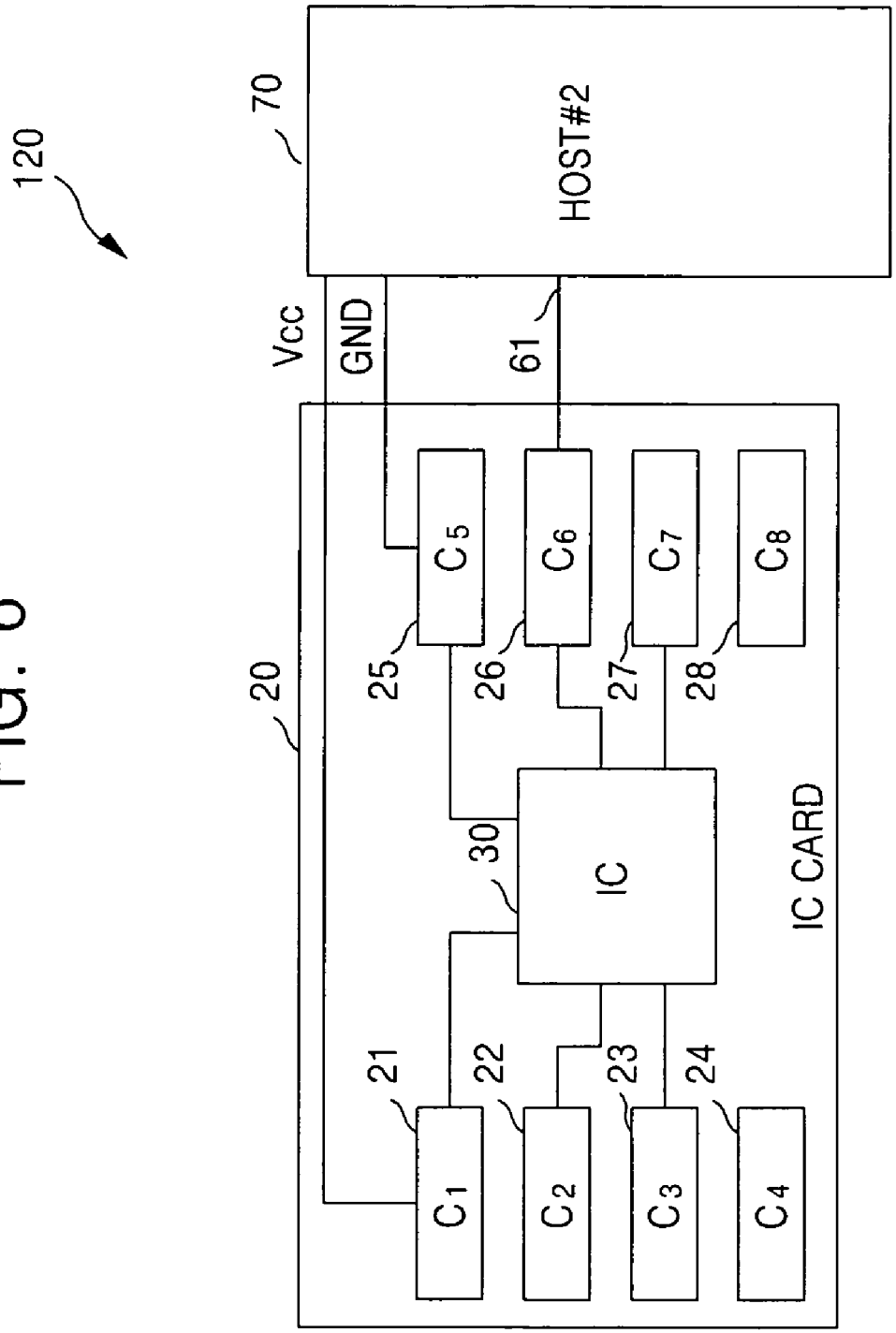
FIG. 6 illustrates a block diagram of a system including a host using a single wire protocol and the IC card according to an exemplary embodiment of the present invention.
Figure 7:
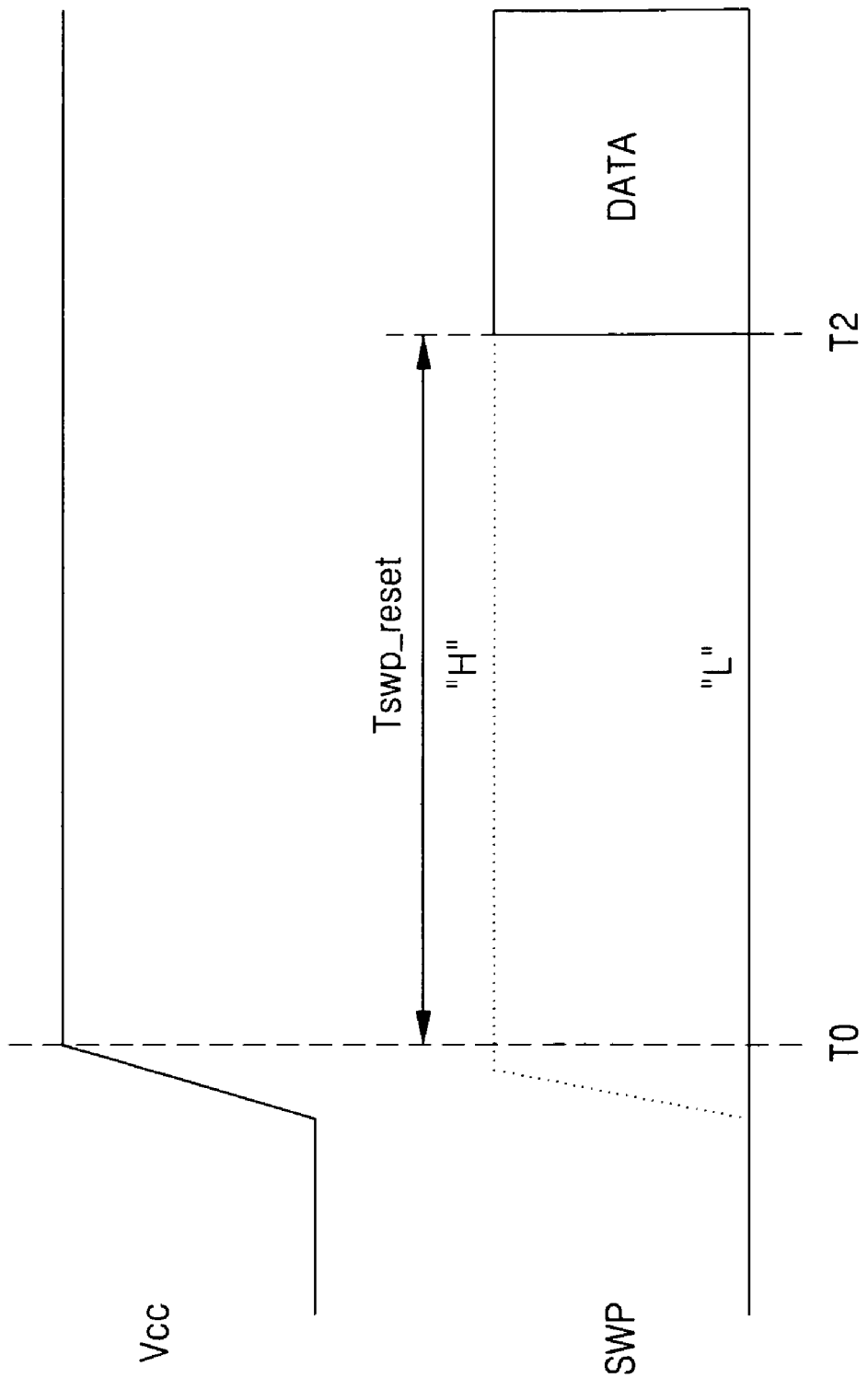
FIG. 7 is a timing diagram illustrating a power-up sequence according to the single wire protocol.

FIG. 6 illustrates a block diagram of the system including a host using a single wire protocol and an IC card according to an exemplary embodiment of the present invention, and FIG. 7 is a timing diagram illustrating a power-up sequence according to the single wire protocol.

Referring to FIGS. 1 through 3, FIG. 6, and FIG. 7, the IC card 20 and the second host 70 exchange data by using only one signal wire 61. Therefore, clock signal and reset signal supplied to a CPU 31 should be generated inside of the IC card 20.

When the IC card 20 and the second host 70 are connected through the contact C6 26 to each other, the voltage level of the contact C6 26 maintains a first state (for example, low level, "L") for a second time period (T2=Tswp_reset measured from a predetermined time point T0). As a reset of a CPU 31 is released after the second time period (T2=Tswp_reset) has passed, the IC card 20 and the second host 70 exchange data through the contact C6 26 and the signal wire 61. However, when the IC card 20 and the second host 70 are not connected to each other, the voltage level of the contact C6 26 maintains a second state (for example, high level, "H").

Figure 8:
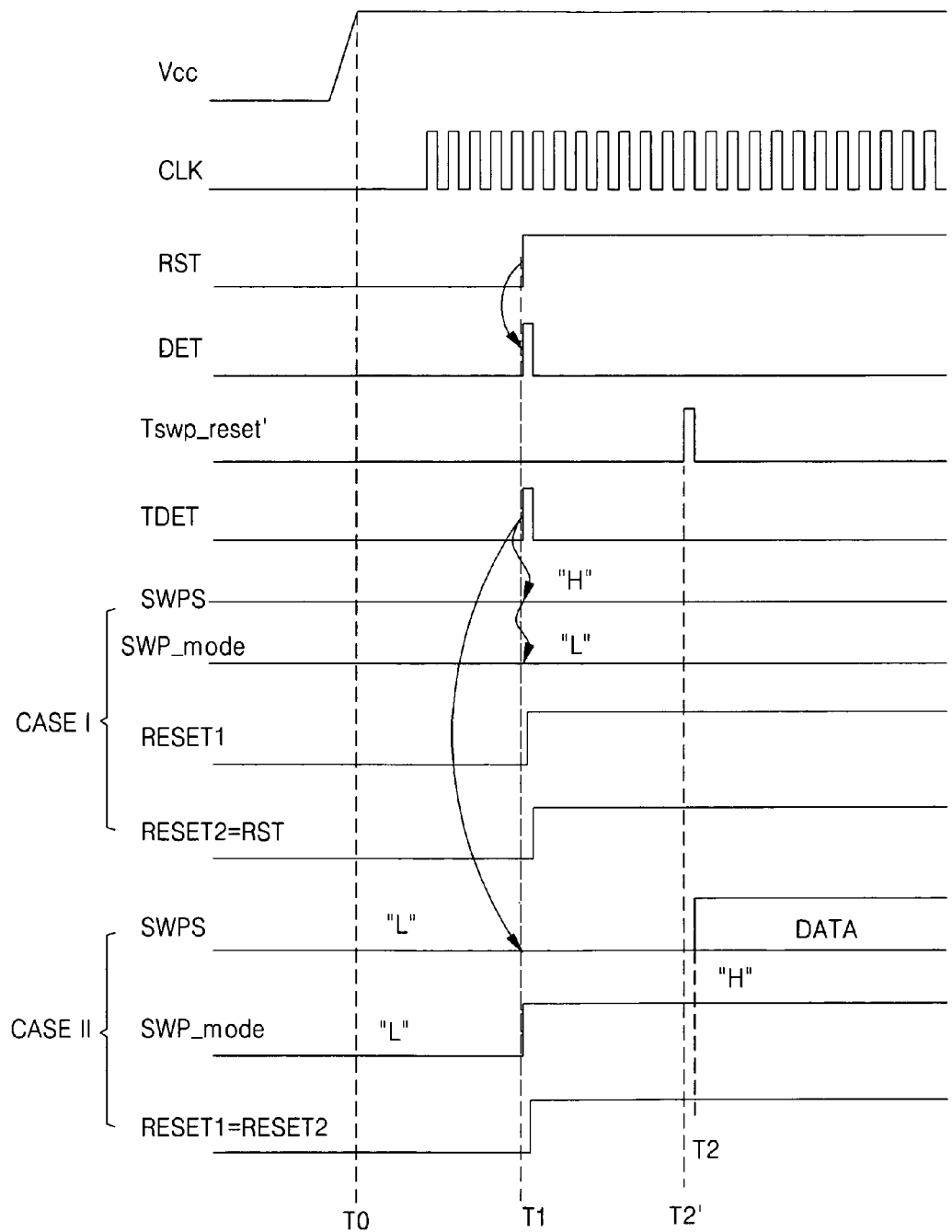
FIG. 8 illustrates a first operation timing diagram of system illustrated in FIG. 1.

FIG. 8 illustrates a first operation timing diagram of the system illustrated in FIG. 1. A timing diagram of "CASE I" illustrated in FIG. 8 is a case where only a first host 50 is connected to an IC card 20 as illustrated in FIG. 4, and a state transition timepoint T1 of an external reset signal RST output from the first host 50 occurs before a reference timepoint T2' or a second time period T2=Tswp_reset.

Referring to FIGS. 2 through 4, and FIG. 8, the reset signal edge detector 301 detects a timepoint (or time T1) when an external reset signal RST transits from a first state to a second state, and outputs a detection signal DET.

The timer 303 measures the reference timepoint T2' in response to a start signal PORS and an internal clock signal Int_osc, and outputs a first indication signal Tswp_reset' according to a result of measurement.

The timer 303 can be replaced with a counter. Therefore, the counter may count a number of internal clock signals Int_osc corresponding to the reference time T2' in response to the start signal PORS, and output the first indication signal Tswp_reset' according to a counting result.

Since the IC card 20 determines a voltage level of the contact C6 26 before a second time T2=Tswp_reset, releases a reset of a CPU 31 before the second time T2=Tswp_reset, and finishes all preparations for exchanging data with a second host 70 through a signal wire 61, the reference time T2' is preferred to be shorter than the second time T2-Tswp_reset illustrated in FIG. 7, however, this preference is optional.

The edge detection timepoint determination circuit 305 is a circuit that determines if a detection signal DET is generated within the reference time T2'. Therefore when the detection signal DET is generated within the reference time T2', the edge detection timepoint determination circuit 305 generates a second indication signal TDET indicating a timepoint (or a time) T1 when the detection signal DET is generated. The edge detection timepoint determination circuit 305 generates a second indication signal TDET indicating the reference timepoint (or a reference time) T2' when the detection signal DET is not generated within the reference time T2' (refer to FIG. 9).

The state detection circuit 307 determines a voltage level of a contact C6 26 and at a timepoint T1 the second indication signal TDET may be generated. The second indication signal TDET may be generated at the timepoint T1, but it may alternatively be generated shortly after timepoint T1.

As shown in CASE I, when the voltage level of the contact C6 26 is high ("H") at the timepoint that the second indication signal TDET is generated, the detection circuit 41 generates a deactivated mode signal SWP_mode. Therefore, the first selection circuit 43 outputs an external clock signals CLK output from a first host 50 to a CPU 31, the second selection circuit 45 outputs an external reset signals RST output from the first host 50 to the CPU 31, and the switch 47 shuts off, each in response to the deactivated mode signal SWP_mode.

Since the detection circuit 41 outputs an activated second reset signal RESET2, i.e., the external reset signals RST to the CPU 31, the CPU 31 releases a reset in response to the activated second reset signals RESET2 and outputs an ATR to the first host 50 through the ISO interface 35 and a contact C7 27 in response to the external clock signals CLK.

The timing diagram of CASE II illustrated in FIG. 8 is a case that the first host 50 and the second host 70 are connected to the IC card 20 simultaneously, and a state transition timepoint T1 of an external reset signal RST output from the first host 50 occurs prior to a reference timepoint T2' or a second time T2=Tswp_reset.

Referring to FIGS. 1 through 3, and FIG. 8, the reset signal edge detector 301 detects a timepoint T1 or an edge of the external reset signals RST which transits from the first state to the second state, and outputs a detection signal DET.

The timer 303 measures a reference timepoint T2' in response to the start signal PORS and the internal clock signal Int_osc, and outputs a first indication signal Tswp_reset' according to a result of measurement.

The edge detection timepoint determination circuit 305 generates a second indication signal TDET indicating a timepoint T1 indicating that the detection signal DET is generated when the detection signal DET is generated within the reference time T2'. The edge detection timepoint determination circuit 305 generates the second indication signal TDET indicating the reference timepoint T2' when the detection signal DET is not generated within the reference time T2' (refer to FIG. 9).

The state detection circuit 307 determines a voltage level of a contact C6 26 when the second indication signal TDET is generated.

As shown in CASE II, the detection circuit 41 generates an activated mode signal SWP_mode when the voltage level of the contact C6 is low ("L") at the timepoint T1 when the second indication signal TDET is generated.

Therefore, in response to the activated mode signals SWP_mode, the first selection circuit 43 outputs an internal oscillation signal Int_osc output from an internal oscillator 39 to the CPU 31, the second selection circuit 45 outputs a first reset signal RESET1=RESET2 to the CPU 31, the switch 47 outputs the internal oscillation signal Int_osc to an SWP interface 33. Therefore the SWP interface 33 is activated (operates) in response to the internal oscillation signal Int_osc.

The CPU 31 releases a reset in response to the activated second reset signal RESET2, receives and transmits data with a second host 70 through the SWP interface 33 and the contact C6 26 in response to the internal oscillation signal Int_osc. Also, the CPU 31 receives and transmits data with the first host 50 through ISO interface 35 and the contact C7 27 in response to the internal oscillation signal Int_osc.

Figure 9:
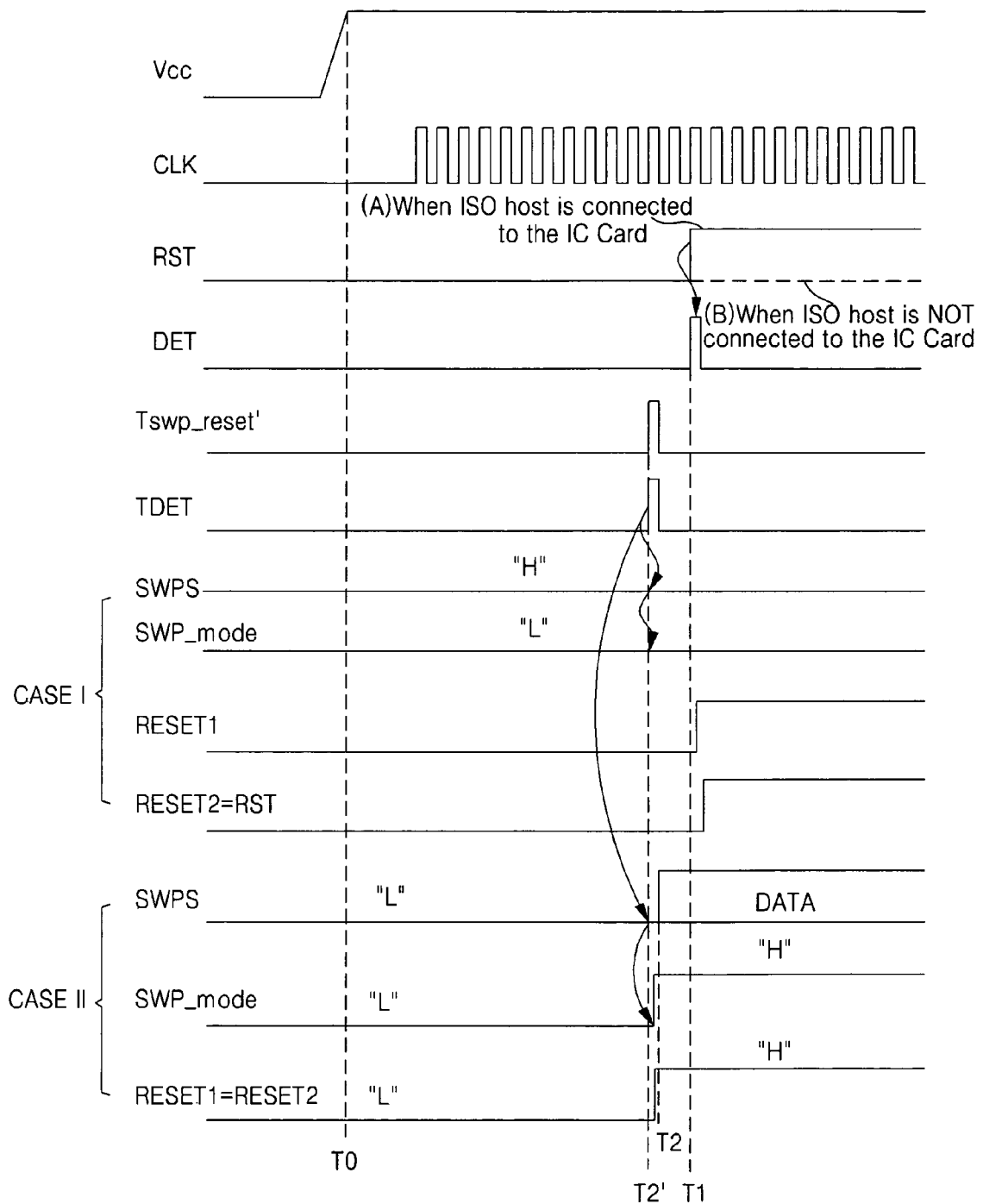
FIG. 9 illustrates a second operation timing diagram of system illustrated in FIG. 1.

FIG. 9 illustrates a second operation timing diagram of the system illustrated in FIG. 1. The timing diagram of CASE I illustrated in FIG. 9 is when only a first host 50 is connected to an IC card 20 as illustrated in FIG. 4, and a state transition timepoint T1 of an external reset signal RST output from the first host 50 occurs after a reference timepoint T2' or a second time T2=Tswp_reset.

The second indication signal TDET may be generated at the same time as reference timepoint T2' or a little later.

As shown in CASE I, the detection circuit 41 generates a deactivated mode signal SWP_mode when a voltage level SWPS of a contact C6 26 is high ("H") when the second indication signal TDET is generated. Therefore, in response to the deactivated mode signals SWP_mode, the first selection circuit 43 outputs an external clock signal CLK output from the first host 50 to the CPU 31, the second selection circuit 45 outputs the external reset signals RST to the CPU 31, and the switch 47 becomes off. Therefore, the SWP interface 33 becomes deactivated.

The CPU 31 releases a reset in response to the activated second reset signals RESET2, and outputs an answer in response (ATR) to the first host 50 through an ISO interface 35 and a contact C7 27 in response to the external clock signal CLK.

The timing diagram in FIG. 9 is a CASE II that the first host 50 and the second host 70 are connected to the IC card 20 simultaneously, and the state transition timepoint T1 of the external reset signal RST output from the first host 50 occurs after the reference timepoint T2' or the second time T2=Tswp_reset.

When the voltage level SWPS of the contact C6 26 is low ("L") at the timepoint T2' when the second indication signal TDET is generated, the state detection circuit 307 of the detection circuit 41 generates an activated first reset signal RESET1 and an activated mode signal SWP_mode. In response to the activated mode signal SWP_mode, the first selection circuit 43 outputs an internal oscillation signal Int_osc to a CPU 31, the second selection circuit 45 outputs an activated first reset signal RESET1=RESET2 to the CPU 31, and the switch 47 outputs the internal oscillation signal Int_osc to the SWP interface 33. The SWP interface 33 is activated (operates) in response to the internal oscillation signal Int_osc.

The CPU 31 releases a reset in response to the activated second reset signal RESET2 output from the second selection circuit 45. The CPU 31 may receive and transmit a predetermined data with the second host 70 through the activated SWP interface 33 and the contact C6 26 in response to the internal oscillation signal Int_osc. Here, the CPU 31 may use the SWP interface 33 and the ISO interface 35 independently or simultaneously.

FIG. 10 is a flowchart illustrating an operating method of the system according to an exemplary embodiment of the present invention. Referring to FIGS. 1 through 10, the method to deactivate circuits related to the second host 70 based on whether or not the second host 70 is connected to an IC 30 is explained below.

The IC 30 selects a first-occurring timepoint T1 of FIG. 8 or T2' of FIG. 9 between an edge detection timepoint T1 of the external reset signal RST output from the first host 50 and the reference timepoint T2' (Step S110). A voltage level of a contact C6 26 is determined and the second host 70 can be connected at the selected first-occurring timepoint T1 of FIG. 8 or T2' of FIG. (Step S120). At least one of the circuits (for example, SWP interface 33) related to the second host 70 is selectively deactivated based on a result of determination (Step S130).

FIG. 11 is a flowchart illustrating an operating method of the system according to an exemplary embodiment of the present invention. Referring to FIGS. 1 through 11, the method to release a reset of a CPU 31 based on whether or not the second host 70 is connected to an IC 30 is explained below.

The IC 30 selects a first-occurring timepoint T1 of FIG. 8 or T2' of FIG. 9 between the edge detection timepoint T1 of the external reset signal RST output from the first host 50 and the reference timepoint T2' (Step S210). The reset of the CPU 31 is released in response to the second reset signal RESET2 at the selected first-occurring timepoint T1 of FIG. 8 or T2' of FIG. 9 (Step S220). Therefore, the CPU 31 may receive and transmit predetermined data with the first host 50 in response to the external clock signal CLK and/or the second host 70 in response to internal oscillation signal Int_osc.

According to an exemplary embodiment of the present invention, an integrated circuit card is capable of supporting a plurality of interfaces at the same time and determines whether or not a host is connected. The integrated circuit card also determines what can communicate through a corresponding interface, before a reset of CPU is released, and may deactivate the corresponding interface according to a result of determination. Accordingly, exemplary embodiments of the present invention may secure smooth operation of the integrated circuit card.

While the present invention has been particularly shown and described with reference to exemplary embodiments thereof, it will be understood by those of ordinary skill in the art that various changes in form and details may be made without departing from the spirit and scope of the present invention.

What is claimed is:

1. An integrated circuit comprising:
   a plurality of eight electrical contacts conforming to ISO 7816 standards;
   a first interface capable of communicating with a first host by utilizing no more than seven of the eight electrical contacts, using one or more ISO 7816 standard protocols;
   a second interface capable of communicating with a second host by utilizing only one of the eight electrical contacts, said second interface not utilizing any of the electrical contacts utilized by the first interface, wherein the second interface communicates with the second host using a single wire protocol (SWP); and
   a control block determining a voltage level of a contact connected to the second host at a first-occurring timepoint between a reference timepoint and a state transition timepoint of an external reset signal output from the first host.

2. The integrated circuit of claim 1, wherein the control block comprises:
   a CPU;
   an internal clock signal generator generating an internal clock signal in response to a start signal;
   a detection circuit generating a first reset signal and a mode signal based on the start signal, the internal clock signal, the external reset signal, and the voltage level of the contact;
   a first selection circuit outputting either an external clock signal output from the first host or the internal clock signal to the CPU based on the mode signal;

a second selection circuit outputting either the external reset signal output from the first host or the first reset signal to the CPU based on the mode signal; and
a switch outputting the internal clock signal to the second interface selectively based on the mode signal.

3. The integrated circuit of claim 2, wherein the CPU releases a reset in response to a second reset signal output from the second selection circuit.

4. The integrated circuit of claim 2, wherein the detection circuit comprises:
a reset signal edge detector detecting a state transition edge of the external reset signal output from the first host and generating a detection signal;
a timer outputting a first indication signal indicating the reference timepoint in response to the start signal and the internal clock signal;
an edge detection timepoint determination circuit outputting a second indication signal indicating the first-occurring timepoint in response to the detection signal and the first indication signal; and
a state detection circuit determining the voltage level of the contact based on the second indication signal, and generating the first reset signal and the mode signal based on a result of the determination.

5. The integrated circuit of claim 2, wherein when the mode signal is activated based on the voltage level of the contact having a first state, the first selection circuit outputs the internal clock signal to the CPU, the second selection circuit outputs the first reset signal to the CPU, and the switch outputs the internal clock signal to the second interface, each in response to the mode signal.

6. The integrated circuit of claim 2, wherein when the mode signal is deactivated based on the voltage level of the contact having a second state, the first selection circuit outputs the external clock signal to the CPU, the second selection circuit outputs the external reset signal to the CPU, and the switch shuts off, each in response to the deactivated mode signal.

7. The integrated circuit of claim 1, wherein the plurality of eight electrical contacts include a C1 contact, a C2 contact, a C3 contact, a C4 contact, a C5 contact, a C6 contact, a C7 contact, and a C8 contact, as defined by ISO 7816 standards, and the first interface utilizes the following contacts: C1, C2, C3, C4, C5, C7, and C8, but cannot utilize the C6 contact, and the second interface is capable of utilizing the C6 contact, but cannot utilize the following contacts: C1, C2, C3, C4, C5, C7, and C8.

8. An integrated circuit card comprising:
a plurality of eight electrical contacts conforming to ISO 7816 standards; and
an integrated circuit connected to the plurality of contacts, wherein the integrated circuit includes,
a first interface capable of communicating with a first host through a first contact among the plurality of contacts using a ISO 7816 protocol;
a second interface capable of communicating with a second host through a second contact among the plurality of contacts using a single wire protocol (SWP); and
a control block determining a voltage level of the second contact at a first-occurring timepoint between a reference timepoint and a state transition timepoint of an external reset signal output from the first host, and deactivating the second interface selectively-based on a result of the determination,
wherein the first interface is not capable of utilizing the second contact and the second interface is not capable of utilizing the first contact.

9. The integrated circuit of claim 8, wherein the control block comprises:
a CPU;
an internal clock signal generator generating an internal clock signal in response to a start signal;
a detection circuit generating a first reset signal and a mode signal based on the start signal, the internal clock signal, the external reset signal, and the voltage level of the second contact;
a first selection circuit outputting either an external clock signal output from the first host or the internal clock signal to the CPU based on the mode signal
a second selection circuit outputting either the external reset signal output from the first host or the first reset signal to the CPU based on the mode signal; and
a switch outputting the internal clock signal to the second interface selectively based on the mode signal.

10. The integrated circuit of claim 9, wherein the CPU releases a reset in response to a second reset signal output from the second selection circuit.

11. The integrated circuit of claim 9, wherein the detection circuit comprises:
a reset signal edge detector detecting a state transition edge of the external reset signal output from the first host and generating a detection signal;
a timer outputting a first indication signal indicating the reference timepoint in response to the start signal and the internal clock signal;
an edge detection timepoint determination circuit outputting a second indication signal indicating the first-occurring timepoint in response to the detection signal and the first indication signal; and
a state detection circuit determining the voltage level of the second contact based on the second indication signal, and generating the first reset signal and the mode signal based on a result of the determination.

12. The integrated circuit of claim 9, wherein when the mode signal is activated based on the voltage level of the second contact having a first state, the first selection circuit outputs the internal clock signal to the CPU, the second selection circuit outputs the first reset signal to the CPU, and the switch outputs the internal clock signal to the second interface, each in response to the mode signal.

13. The integrated circuit of claim 9, wherein when the mode signal is inactivated based on the voltage level of the contact in a second state, the first selection circuit outputs the external clock signal to the CPU, the second selection circuit outputs the external reset signal to the CPU, and the switch becomes off, each in response to the deactivated mode signal.

14. An integrated circuit comprising:
a plurality of eight electrical contacts conforming to ISO 7816 standards;
a first interface capable of communicating with a first host by utilizing no more than seven of the eight electrical contacts, using one or more ISO 7816 standard protocols;
a second interface capable of communicating with a second host by utilizing only one of the eight electrical contacts and radio frequency (RF) communication, said second interface not utilizing any of the electrical contacts utilized by the first interface; and
a control block determining a voltage level of a contact connected to the second host at a first-occurring timepoint between a reference timepoint and a state transition timepoint of an external reset signal output from the first host.

15. The integrated circuit of claim 14, wherein the plurality of eight electrical contacts include a C1 contact, a C2 contact, a C3 contact, a C4 contact, a C5 contact, a C6 contact, a C7 contact, and a C8 contact, as defined by ISO 7816 standards, and the first interface utilizes the following contacts: C1, C2, C3, C4, C5, C7, and C8, but cannot utilize the C6 contact, and the second interface is capable of utilizing the C6 contact, but cannot utilize the following contacts: C1, C2, C3, C4, C5, C7, and C8.

\* \* \* \* \*